UNITED STATES PATENT OFFICE 2,549,576

PENTACHLOROTHIOLANE AND METHOD FOR PRODUCING THE SAME

Harry L. Coonradt, Woodbury, and Howard D. Hartough, Pitman, N. J., assignors to Socony-Vacuum Oil Company, Incorporated, a corporation of New York No Drawing. Application May 14, 1948, Serial No. 27,147

8 Claims. (Cl. 260—332.5)

This invention relates to a new composition of matter, namely, a pentachlorothiolane, and to a method for synthesizing the same.

It has been discovered, in accordance with the present invention, that controlled low temperature chlorination of a monochlorothiophene results in the formation of a new chemical compound which has been identified as a pentachlorothiolane. Thus, low temperature chlorination of 2-chlorothiophene by the process described herein yields 2,2,3,4,5-pentachlorothiolane, characterized by the structural formula:

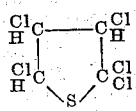

This compound may be viewed as a product of the addition of chlorine to the two double bonds of 2-chlorothiophene. It is prepared in accordance with the procedure of this invention by chlorinating 2-chlorothiophene at a temperature below 0° C., preferably below −25° C. and thereafter removing pentachlorothiolane by crystallization thereof from the resulting reaction product liquid.

The molar ratio of chlorine to monochlorothiophene employed in the present process will generally be at least 1 and preferably not greater than about 5. While amounts of chlorine greater than about one mole per mole of thiophene have been found to result in increased yields of the desired pentachlorothiolane, a large excess of chlorine should desirably be avoided since higher melting polychlorinated products are thereby obtained, which tend to interfere with the separation of desired pentachlorothiolane.

While the temperature at which chlorination is effected may extend from 0° C. down to about −70° C., the preferred temperature range will generally be between about −25° C. and about −70° C. A particularly convenient means for meeting the low temperature requirement is a Dry Ice-acetone bath, which maintains the reaction mixture within the above-identified range during chlorination.

At the completion of chlorination, the resulting reaction product mixture is suitably, although not necessarily, blown with an inert gas such as nitrogen, and the like, for a short interval of time to free the mixture of volatile materials such as hydrogen chloride.

The reaction mixture is then cooled to a temperature at which crystallization of pentachlorothiolane takes place, generally at about −70° C. The separation of pentachlorothiolane by crystallization from the reaction product liquid is facilitated by the use of a solvent such as petroleum ether. While the use of such solvent is not absolutely necessary, it is desirable in that the speed at which crystallization of the pentachlorothiolane occurs is thereby perceptibly increased. The resulting crystals of pentachlorothiolane are then separated by filtration.

The new compound of this invention is a white crystalline solid with a melting point of 31–32° C. and a refractive index $N_D^{35}$ of 1.5755. It is readily soluble in the common organic solvents. The compound contains reactive chlorine capable of entering into a number of different chemical reactions and may serve as an intermediate in chemical synthesis of compounds suitable for use in the pharmaceutical, dye, and allied industries. Composition of the new compound was established by the following analysis:

| | Found | Calc. for $C_4SCl_5H_3$ |
|---|---|---|
| | Per cent | Per cent |
| Chlorine | 67.9 | 68.08 |
| Sulfur | 12.5 | 12.31 |
| Carbon | 18.32 | 18.45 |
| Hydrogen | 1.09 | 1.16 |
| Total | 99.8 | 100 |

Pentachlorothiolane is converted by pyrolysis and by treatment with alcoholic potassium hydroxide into trichlorothiophenes.

The following examples will serve to illustrate the process of this invention without limiting the same:

Example 1

One hundred nineteen grams (1 mole) of 2-chlorothiophene were chlorinated with approximately one mole of chlorine. The reaction mixture was maintained at approximately −30° C. by a Dry Ice-acetone bath during the chlorination. At the conclusion of the chlorination, nitrogen was passed through the cold reaction mixture for 5 minutes. The reaction mixture weighed 178 grams. The mixture was cooled to −70° C. and crystallization occurred. Some petroleum ether was added to facilitate the separation and filtration of pentachlorothiolane. The cooled mixture was filtered and the pentachlorothiolane was collected as a white crystalline solid having a melting point of 31–32° C.

Example 2

One hundred nineteen grams (1 mole) of 2- chlorothiophene were chlorinated with one mole of chlorine. The reaction mixture was maintained at approximately −30° C. to −35° C. by means of a Dry Ice-acetone bath during the chlorination. At the conclusion of the chlorination, nitrogen was passed through the cold reaction mixture for 5 minutes. The reaction mixture weighed 158 grams. Fifteen milliliters of petroleum ether were added and the mixture was cooled to −70° C. Initial crystallization was slow but proceeded at a faster rate after an additional 10 milliliters of petroleum ether were added. The cold reaction mixture was filtered and yielded 22 grams of white crystalline pentachlorothiolane having a melting point of 31–32° C.

*Example 3*

One hundred nineteen grams (1 mole) of 2-chlorothiophene were chlorinated with 2 moles of chlorine. The reaction mixture was maintained at approximately −30° C. to −35° C. by a Dry Ice-acetone bath during the chlorination. At the conclusion of the chlorination, nitrogen was passed through the cold reaction mixture for 5 minutes. The reaction mixture weighed 203 grams. Fifteen milliliters of petroleum ether were added and the mixture was cooled to −70° C. Initial crystallization was slow but the rate of crystallization was increased upon the addition of 10 more milliliters of petroleum ether. The resulting cold reaction mixture was filtered to yield 46 grams of white crystalline pentachlorothiolane having a melting point of 31–32° C.

We claim:

1. As a new composition of matter, 2,2,3,4,5-pentachlorothiolane.

2. A method for preparing 2,2,3,4,5-pentachlorothiolane, which comprises reacting 2-chlorothiophene with chlorine at a temperature below 0° C. but above −70° C. and thereafter cooling the resulting reaction product liquid to crystallization and removing the crystals of 2,2,3,4,5-pentachlorothiolane so obtained.

3. A method for preparing 2,2,3,4,5-pentachlorothiolane, which comprises reacting 2-chlorothiophene with chlorine at a temperature below −25° C. but above −70° C. and thereafter cooling the resulting reaction product liquid to crystallization and removing the crystals of 2,2,3,4,5-pentachlorothiolane so obtained.

4. A method for preparing 2,2,3,4,5-pentachlorothiolane, which comprises reacting 2-chlorothiophene with chlorine at a temperature below 0° C. but above −70° C., the molar ratio of chlorine to 2-chlorothiophene being at least 1 and not more than about 5 and thereafter cooling the resulting reaction product liquid to crystallization and removing the crystals of 2,2,3,4,5-pentachlorothiolane so obtained.

5. A method for preparing 2,2,3,4,5-pentachlorothiolane, which comprises reacting 2-chlorothiophene with chlorine at a temperature within the approximate range of −30° C. to −35° C. and thereafter cooling the resulting reaction product liquid to a temperature at which crystallization takes place and removing the crystals of 2,2,3,4,5-pentachlorothiolane so obtained.

6. A method for preparing 2,2,3,4,5-pentachlorothiolane, which comprises reacting 2-chlorothiophene with chlorine at a temperature within the approximate range of −30° C. to −35° C., the molar ratio of chlorine to 2-chlorothiophene being at least 1 and not more than about 5 and thereafter cooling the resulting reaction product liquid to a temperature at which crystallization takes place and removing the crystals of 2,2,3,4,5-pentachlorothiolane so obtained.

7. A method for preparing 2,2,3,4,5-pentachlorothiolane, which comprises reacting 2-chlorothiophene with chlorine at a temperature within the approximate range of −30° C. to −35° C., blowing the resulting reaction product mixture with an inert gas and thereafter cooling the resulting reaction product liquid to a temperature at which crystallization takes place and removing the crystals of 2,2,3,4,5-pentachlorothiolane so obtained.

8. A method for preparing 2,2,3,4,5-pentachlorothiolane, which comprises reacting 2-chlorothiophene with chlorine at a temperature within the approximate range of −30° C. to −35° C., blowing the resulting reaction product mixture with an inert gas, adding an organic solvent to the reaction mixture so treated and cooling to a temperature at which crystallization takes place and removing the crystals of 2,2,3,4,5-pentachlorothiolane so obtained.

HARRY L. COONRADT.
HOWARD D. HARTOUGH.

REFERENCES CITED

The following references are of record in the file of this patent:

UNITED STATES PATENTS

| Number | Name | Date |
|---|---|---|
| 2,443,493 | Cass | June 15, 1948 |

OTHER REFERENCES

Ber. 17, 794–795 (1884).
Ber. 19, 650 (1886) Q D 1 D 4.
Chem. Abstracts 32:3392 (1938).
Weygand, "Organic Preparations," pages 51 and 71, Interscience Publishers, 1945.